(12) United States Patent
Steen et al.

(10) Patent No.: US 12,703,034 B2
(45) Date of Patent: Aug. 11, 2026

(54) HACKSAW WITH HANDLE TENSIONING MECHANISM

(71) Applicant: Apex Brands, Inc., Apex, NC (US)

(72) Inventors: Noah Steen, Apex, NC (US); Andrew Speciale, Raleigh, NC (US); Michael Dunigan, Apex, NC (US); Jeromy Higgins, Fishers, IN (US); Matthew Poppe, Raleigh, NC (US)

(73) Assignee: Apex Brands, Inc., Apex, NC (US)

( * ) Notice: Subject to any disclaimer, the term of this patent is extended or adjusted under 35 U.S.C. 154(b) by 288 days.

(21) Appl. No.: 18/561,396

(22) PCT Filed: Jun. 20, 2022

(86) PCT No.: PCT/US2022/034136
§ 371 (c)(1),
(2) Date: Nov. 16, 2023

(87) PCT Pub. No.: WO2022/271577
PCT Pub. Date: Dec. 29, 2022

(65) Prior Publication Data

US 2024/0253137 A1 Aug. 1, 2024

Related U.S. Application Data

(60) Provisional application No. 63/212,944, filed on Jun. 21, 2021.

(51) Int. Cl.
*B23D 51/12* (2006.01)
*B23D 49/12* (2006.01)
*B23D 51/14* (2006.01)

(52) U.S. Cl.
CPC .......... *B23D 51/125* (2013.01); *B23D 49/12* (2013.01); *B23D 51/14* (2013.01)

(58) Field of Classification Search
CPC .............................. B23D 49/12; B23D 51/125
See application file for complete search history.

(56) References Cited

U.S. PATENT DOCUMENTS 973,431 A * 10/1910 Hoffmann .............. B23D 49/12 30/510
1,174,893 A * 3/1916 Page ..................... B23D 49/12 30/507

(Continued)

FOREIGN PATENT DOCUMENTS

CN 205851975 U 1/2017
EP 2407264 B1 2/2018

OTHER PUBLICATIONS

Office Action issued in corresponding Australian Patent Application No. 2022300188 mailed Jan. 3, 2025, all pages cited in its entirety.

(Continued)

*Primary Examiner* — Sean M Michalski
(74) *Attorney, Agent, or Firm* — Burr & Forman

(57) ABSTRACT

A hacksaw may include a blade support frame, a handle operably coupled to the blade support frame at a first end of the blade support frame, a movable blade engagement assembly and a multi-function fixed blade engagement assembly. The multi-function fixed blade engagement assembly may be disposed at a second end of the blade support frame. The multi-function fixed blade engagement assembly may include a first clamping structure to affix a first end of a blade to the hacksaw via an engagement pin and a second clamping structure to affix a portion of the blade spaced apart from the first end to the hacksaw via a clamping or pinching force exerted on the portion of the blade. The movable blade engagement assembly may be operably coupled to the handle and to a second end of the blade.

(Continued)

Tension on the blade may be adjustable by adjustment of the movable blade engagement assembly.

19 Claims, 8 Drawing Sheets

(56) References Cited

U.S. PATENT DOCUMENTS 1,484,332 A 2/1924 Jaques
2,194,494 A * 3/1940 Carroll ................. B23D 51/125 30/511
2,532,506 A * 12/1950 Mansfield .............. B23D 49/12 30/511
3,329,186 A * 7/1967 David .................... B23D 49/12 30/508
3,702,627 A * 11/1972 Dreier .................. B23D 51/125 30/514
3,756,298 A * 9/1973 West ...................... B23D 49/14 30/507
3,797,545 A 3/1974 Dreier
3,821,974 A * 7/1974 Merrow ................. B23D 51/14 30/508
3,822,731 A * 7/1974 Keymer ............... B23D 51/125 30/513
4,349,059 A * 9/1982 Hepworth .............. B23D 51/14 D8/96
4,835,869 A 6/1989 Waldherr
5,063,675 A * 11/1991 Michas ................ B23D 51/125 30/507
5,471,752 A * 12/1995 Koetsch ............... B23D 51/125 30/506
5,673,488 A * 10/1997 Grayo .................. B23D 51/125 30/507
5,768,788 A * 6/1998 Arnold ................. B23D 51/125 30/506
5,826,344 A * 10/1998 Phelon ................... B23D 51/14 30/506
6,079,109 A * 6/2000 Ranieri ................ B23D 51/125 30/513
6,266,887 B1 * 7/2001 Owens ................. B23D 51/125 76/112
6,711,825 B2 * 3/2004 Chen ....................... B27B 21/02 30/523
7,269,905 B1 * 9/2007 Huang ................... B23D 49/14 30/507
7,516,554 B2 * 4/2009 Ping ....................... B23D 51/10 30/507
8,613,146 B2 * 12/2013 Ebner .................... B23D 49/12 30/523
8,984,994 B2 * 3/2015 Huang ...................... B25F 1/02 30/507
2006/0213068 A1 * 9/2006 Chen ....................... B27B 21/02 30/513
2008/0092400 A1 * 4/2008 Circosta ................. B23D 49/12 30/508
2011/0061248 A1 * 3/2011 Ebner .................... B23D 51/14 30/330
2013/0205605 A1 * 8/2013 Huang ................... B23D 51/14 30/329
2014/0259703 A1 * 9/2014 Green .................. B23D 51/125 29/456

OTHER PUBLICATIONS

Extended European Search Report issued in corresponding European Patent Application No. 22829073.0 mailed Mar. 20, 2025, all pages cited in its entirety.
Notice of the First Office Action from the corresponding Chinese Application No. 202280038409.5, mailed Sep. 30, 2025, all pages cited in its entirety.
International Search Report and Written Opinion from corresponding International Application No. PCT/US2022/034136 mailed Sep. 13, 2022, all pages cited in its entirety.

* cited by examiner

HACKSAW WITH HANDLE TENSIONING MECHANISM

TECHNICAL FIELD

Example embodiments generally relate to cutting devices, and more particularly relate to a hacksaw that has a tensioning mechanism integrated into the handle.

BACKGROUND

Hacksaws are useful tools for cutting various types of media including metal. Although some hacksaws are powered, most are hand operated, and most also include a blade that is mounted via mounting holes that pass through opposite longitudinal ends of the blades. A C-shaped frame extends forward from a handle such that opposing ends of the C-shaped frame engage the mounting holes with pins or other mounting apparatuses that pass through the mounting holes. The hacksaw often includes (e.g., at an of the C-shaped frame that is opposite the handle) a tensioning mechanism that pulls one of the pins to increase tension on the blade by stretching the blade between the mounting holes.

In many cases, the handle is a pistol grip that is attached to a portion of the C-shaped frame that is separated or spaced apart from the closest of the opposing ends of the C-shaped frame. This structure effectively frees up each of the opposing ends of the C-shaped frame so that the tensioning mechanism could be placed at either end. These conventional hacksaws are typically useable, however, only with a single blade size that is designed to fit precisely between the pins at the opposing ends of the C frame. This inflexible structure makes for a relatively large tool, which may take up substantial space when stored, and which may also not be conducive to being placed in most tool bags or boxes for transport. Accordingly, it may be desirable to provide an improved structure that can be used with multiple blade sizes, and which is more easily stored or transported.

BRIEF SUMMARY OF SOME EXAMPLES

Some example embodiments may enable the provision of an improved hacksaw. The hacksaw may include a blade support frame, a handle operably coupled to the blade support frame at a first end of the blade support frame, a movable blade engagement assembly and a multi-function fixed blade engagement assembly. The multi-function fixed blade engagement assembly may be disposed at a second end of the blade support frame. The multi-function fixed blade engagement assembly may include a first clamping structure to affix a first end of a blade to the hacksaw via an engagement pin and a second clamping structure to affix a portion of the blade spaced apart from the first end to the hacksaw via a clamping or pinching force exerted on the portion of the blade. The movable blade engagement assembly may be operably coupled to the handle and to a second end of the blade. Tension on the blade may be adjustable by adjustment of the movable blade engagement assembly.

In another example embodiment, a hacksaw may be provided that includes a blade support frame, a handle operably coupled to the blade support frame at a first end of the blade support frame, a (first) multi-function fixed blade engagement assembly, and a second blade engagement assembly. The multi-function fixed blade engagement assembly may be disposed at a second end of the blade support frame. The multi-function fixed blade engagement assembly may include a first clamping structure to affix a first end of a blade to the hacksaw via an engagement pin and a second clamping structure to affix a portion of the blade spaced apart from the first end to the hacksaw via a clamping or pinching force exerted on the portion of the blade. The second blade engagement assembly may be operably coupled to the handle and to a second end of the blade.

In still another example embodiment, a hacksaw may be provided that includes a blade support frame, a handle operably coupled to the blade support frame at a first end of the blade support frame, a movable blade engagement assembly and a fixed blade engagement assembly. The fixed blade engagement assembly may be disposed at a second end of the blade support frame. The movable blade engagement assembly may be operably coupled to the handle and to a second end of the blade. Tension on the blade may be adjustable by adjustment at the movable blade engagement assembly and corresponding linear movement of the movable blade engagement assembly.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
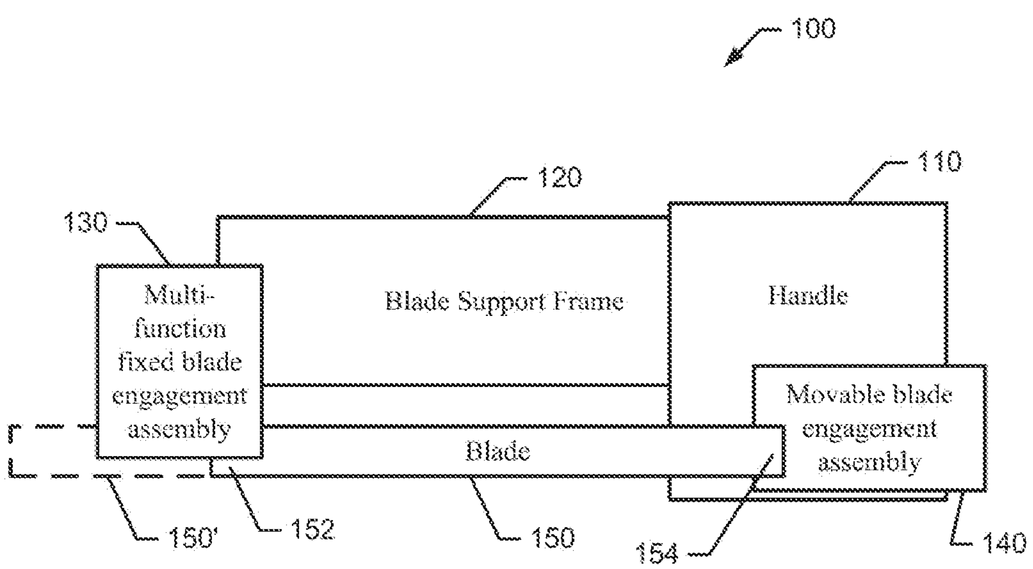
FIG. 1 is a block diagram of a hacksaw in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a hacksaw 100 according to an example embodiment. The hacksaw 100 may include a handle 110 and a blade support frame 120. The blade support frame 120 is operably coupled to a multi-function fixed clamping assembly 130 at a first end thereof. The blade support frame 120 is also operably coupled to a movable blade engagement assembly 140 proximate to a second end thereof. The movable blade engagement assembly 140 is also integrated into the handle 110.

The multi-function fixed blade engagement assembly 130 is structured to engage a blade at one of two possible locations on the blade, via two different engagement structures. Which of the two different engagement structures is used depends upon the length of the blade that is being used. In this regard, FIG. 1 shows two different blade sizes that can be engaged by the hacksaw 100 of example embodiments.

A first (or short) blade 150 is shown in solid lines, and has a first end 152 and a second end 154. The first end 152 is physically engaged by, and gripped/retained by, a first engagement structure of the multi-function fixed blade engagement assembly 130. The first engagement structure is at a fixed location (e.g., at a distal end of the blade support frame 120). In an example embodiment, the first end 152 may include a first mounting hole through which a pin of the first engagement structure of the multi-function fixed blade engagement assembly 130 passes to engage the first blade 150.

Meanwhile, a second (longer) blade 150' is shown in FIG. 1 as including two pieces (i.e., the solid line portions of the first blade 150 and the dashed line portion that extends from the second end 154 of the first blade 150). As such, for the second blade 150', the first end 152 actually marks an intermediate portion of the second blade 150'. This intermediate portion (again marked by the first end 152) would not include the first mounting hole noted above. Instead, the mounting hole for the second blade 150' is located at first end 152' of the second blade 150'. Thus, the mounting hole for the second blade 150' can be seen to extend past the multi-function fixed blade engagement assembly 130, and is therefore not engaged at all or free, even when the multi-function fixed blade engagement assembly 130 is in fixed engagement with the second blade 150'. In this regard, the intermediate portion of the second blade 150' (at location marked by the first end 152 of the first blade 150) is physically engaged by, and gripped/retained by, a second engagement structure of the multi-function fixed blade engagement assembly 130. The second engagement structure may include a clamp that can be tightened onto the second blade 150' at the intermediate portion of the second blade 150' as described in greater detail below.

In an example embodiment, the second end 154 may be identical for both the first blade 150 and the second blade 150'. The second end 154 may be physically engaged by, and gripped/retained by, the movable blade engagement assembly 140. The movable blade engagement assembly 140 (as the name suggests) is movable relative to the handle 110 and/or the blade support frame 120 to increase (or decrease) tension on the first blade 150. In this regard, while the multi-function fixed blade engagement assembly 130 grips or engages the first blade 150 or the second blade 150' at a fixed location (i.e., the first end 152 or the intermediate portion), the movable blade engagement assembly 140 engages the second end 154 and is able to move relative to the handle 110 and the blade support frame 120 to carry the second end 154 away from the first end 152 or intermediate portion to increase tension on the first blade 150 or second blade 150'. In an example embodiment, the second end 154 may include a second mounting hole through which a pin of the movable blade engagement assembly 140 passes to engage the first blade 150 or the second blade 150'.

Figure 2:
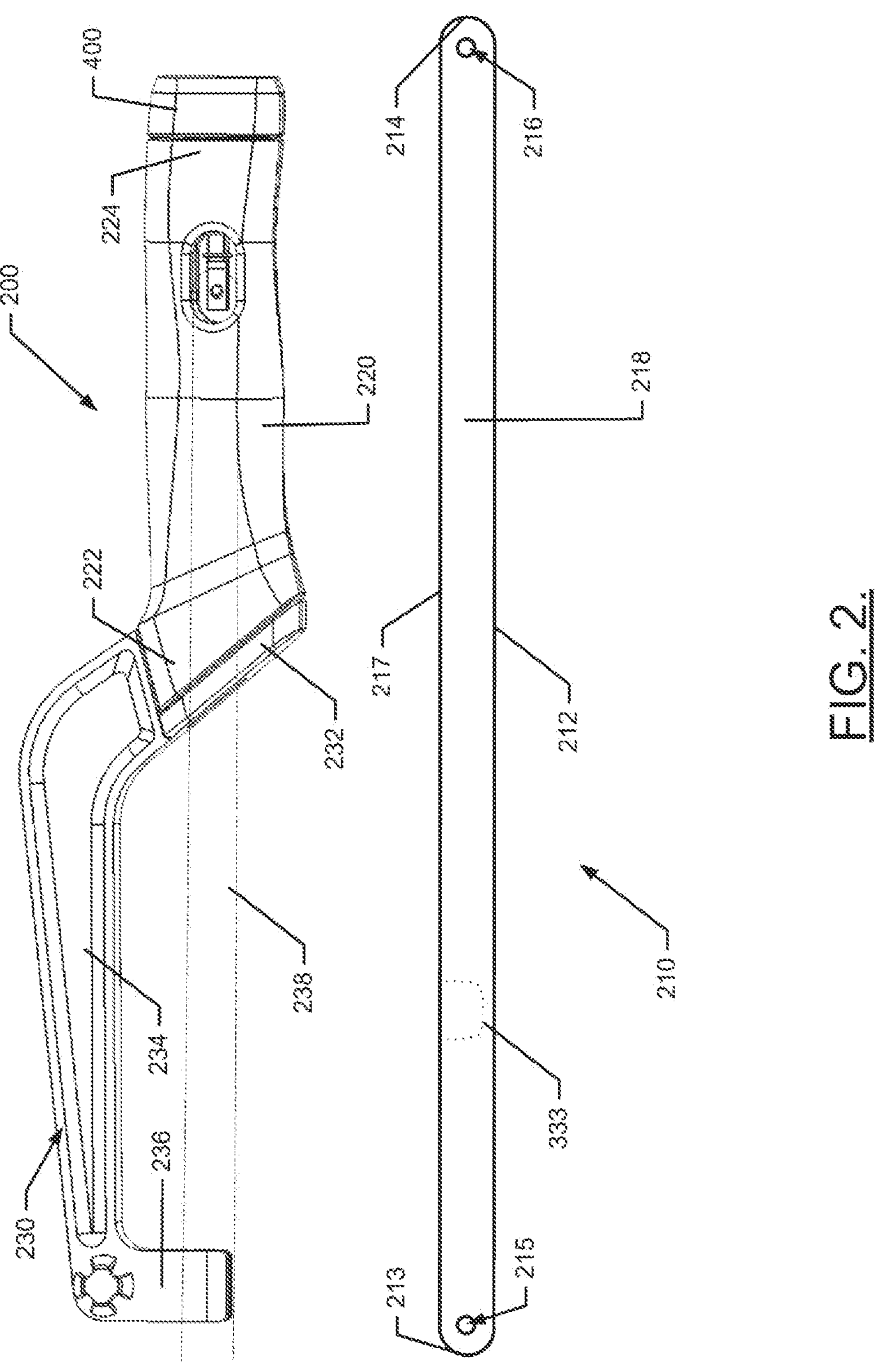
FIG. 2 is a side view of a blade and a hacksaw in accordance with an example embodiment.
Figure 3:
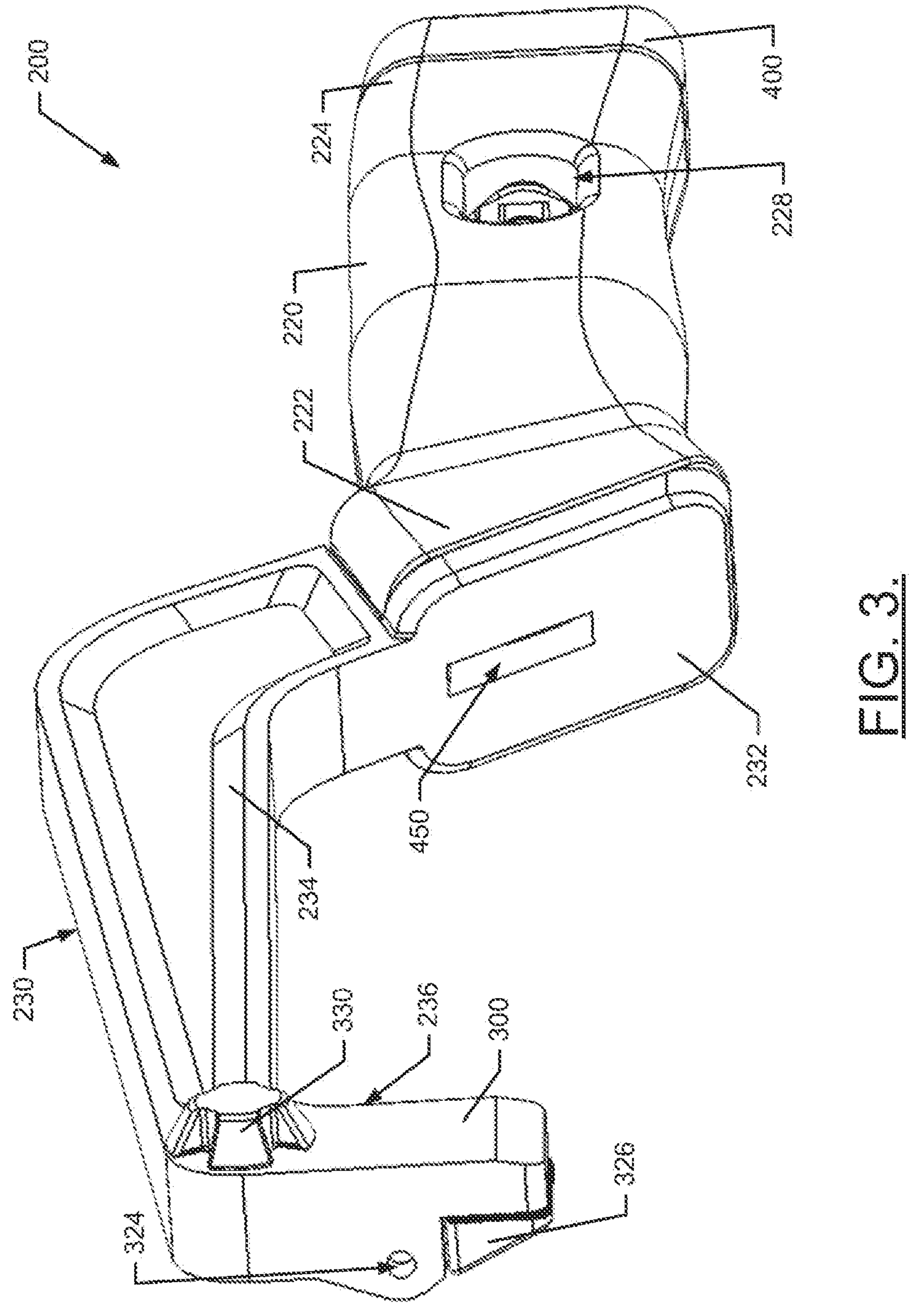
FIG. 3 is a perspective view of the hacksaw in accordance with an example embodiment.
Figure 4:
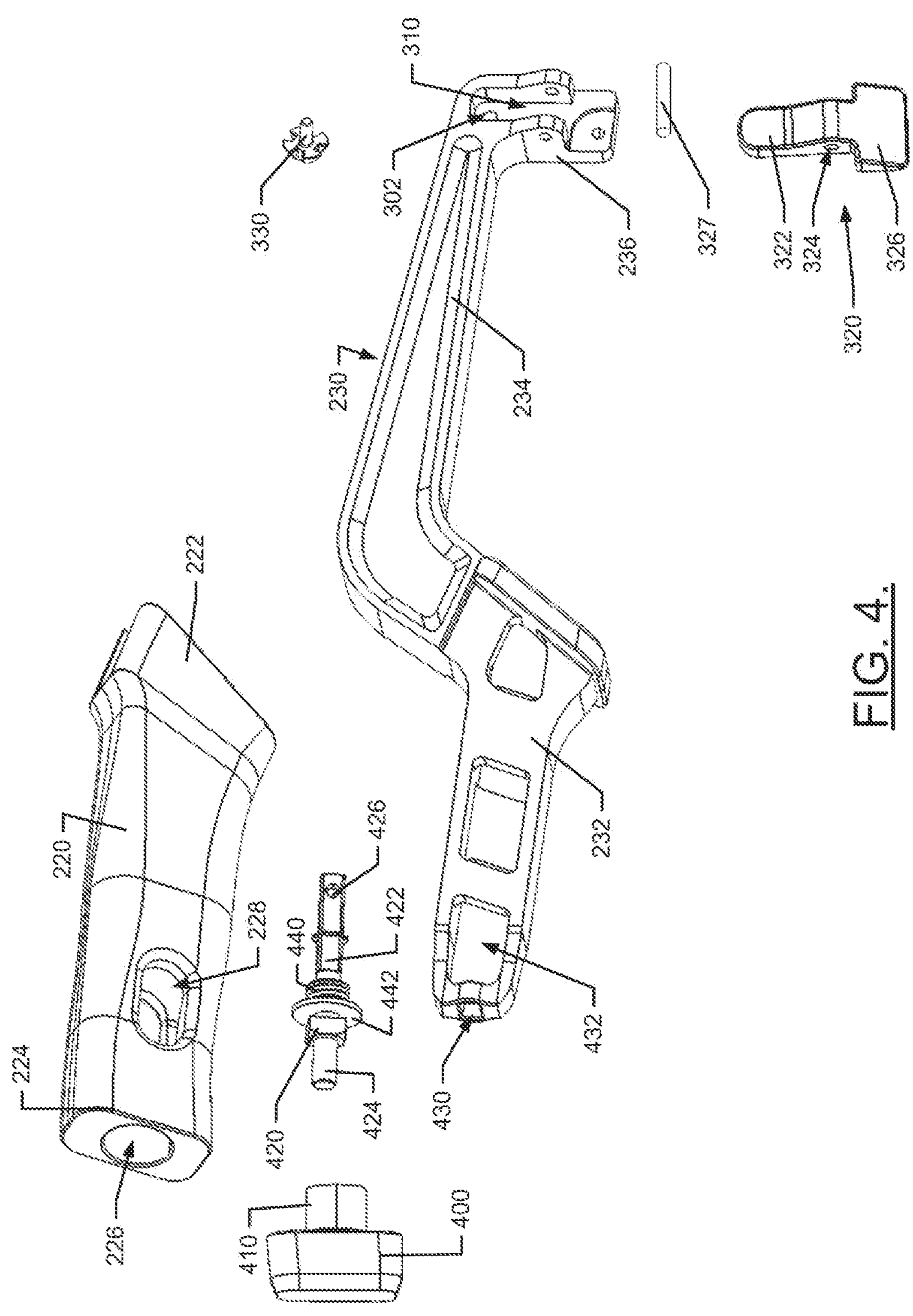
FIG. 4 is an exploded view of the hacksaw of FIG. 3 in accordance with an example embodiment.

The specific components used to implement the movable blade engagement assembly 140 and the first and second engagement structures of the multi-function fixed blade engagement assembly 130 may vary in different example embodiments. However, some example components are shown in greater detail in FIGS. 2-8 in order to illustrate an example embodiment in greater detail. In this regard, FIG. 2 illustrates a side view of both a hacksaw 200 of an example embodiment, and a blade 210 that may be retained by the hacksaw 200. The hacksaw 200 is one example of the hacksaw 100 described above in reference to FIG. 1. The blade 210 is one example of the second blade 150' of FIG. 1. FIG. 3 shows a perspective view of the hacksaw 200 assembled without the blade 210, and FIG. 4 illustrates an exploded view of the hacksaw 200. FIGS. 5-8 show isolated portions of structures/components that may be used to implement the multi-function fixed blade engagement assembly 130 and the movable blade engagement assembly 140 of FIG. 1.

Referring first to FIG. 2, the blade 210 includes a cutting edge 212 on which a plurality of teeth are disposed. The blade 100 also has a first end 213 and a second end 214 in which a first mounting hole 215 and a second mounting hole 216, respectively, may be disposed. The cutting teeth may extend along all or almost all of the cutting edge 212 in some cases. The blade 210 may also include a top edge 217, which may be disposed opposite the cutting edge 212. Side faces may be disposed opposite each other extending between lateral edges of the cutting edge 212 and the top edge 217. Only one side face 218 is shown in FIG. 2, and it should be appreciated that the first and second mounting holes 215 and 216 are through holes that extend from the side face 218 shown through the blade 210 to the opposite side face (which is not visible in FIG. 2).

Hacksaw 200 includes a handle portion 220 having a first end 222 and a second end 224. The handle portion 220 may also include a cavity 226 that extends along the longitudinal length of the handle portion 220 through a center thereof. The cavity 226 may be shaped to receive a portion of a blade support frame 230 of the hacksaw 200. The handle portion 220 may also include one or more viewing windows 228 that be extend into the cavity 226 from one or both lateral sides of the handle portion 220. If an instance of the viewing window 228 is provided on each of the lateral sides of the handle portion 220, the combination of the viewing windows 228 may essentially form a continuous opening passing through the handle portion 220 in a direction perpendicular to the longitudinal centerline of the handle portion 220.

The blade support frame 230 includes an insertion portion 232, an extension portion 234, and an engaging arm 236. The insertion portion 232, the extension portion 234, and the engaging arm 236 may combine to form a C-shaped structure, as noted above. However, a substantial portion of the insertion portion 232 may be inserted into the handle portion 220 in example embodiments. When the blade 210 is being retained by the hacksaw 200 (as shown by dashed lines 238 in FIG. 2), a portion of the blade 210 is inserted into the insertion portion 232. The extension portion 234 may extend substantially parallel to and spaced apart from the blade 210 when the blade 210 is being retained in the hacksaw 200. Both the insertion portion 232 and the engaging arm 236 may extend away from distal ends of the extension portion 234 and toward the blade 210.

Figure 5:
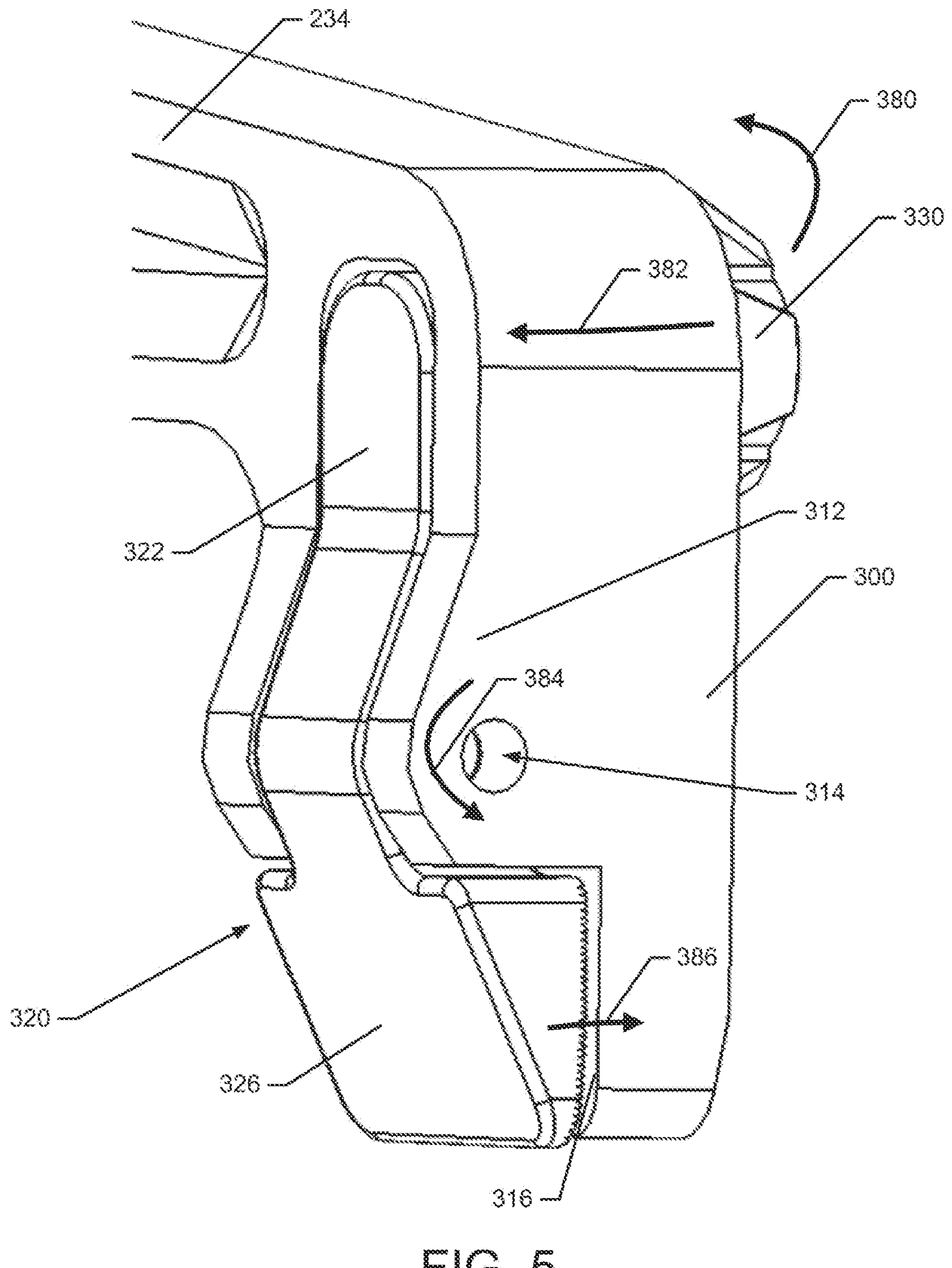
FIG. 5 is a perspective view of a multi-function blade engagement assembly in accordance with an example embodiment.
Figure 6:
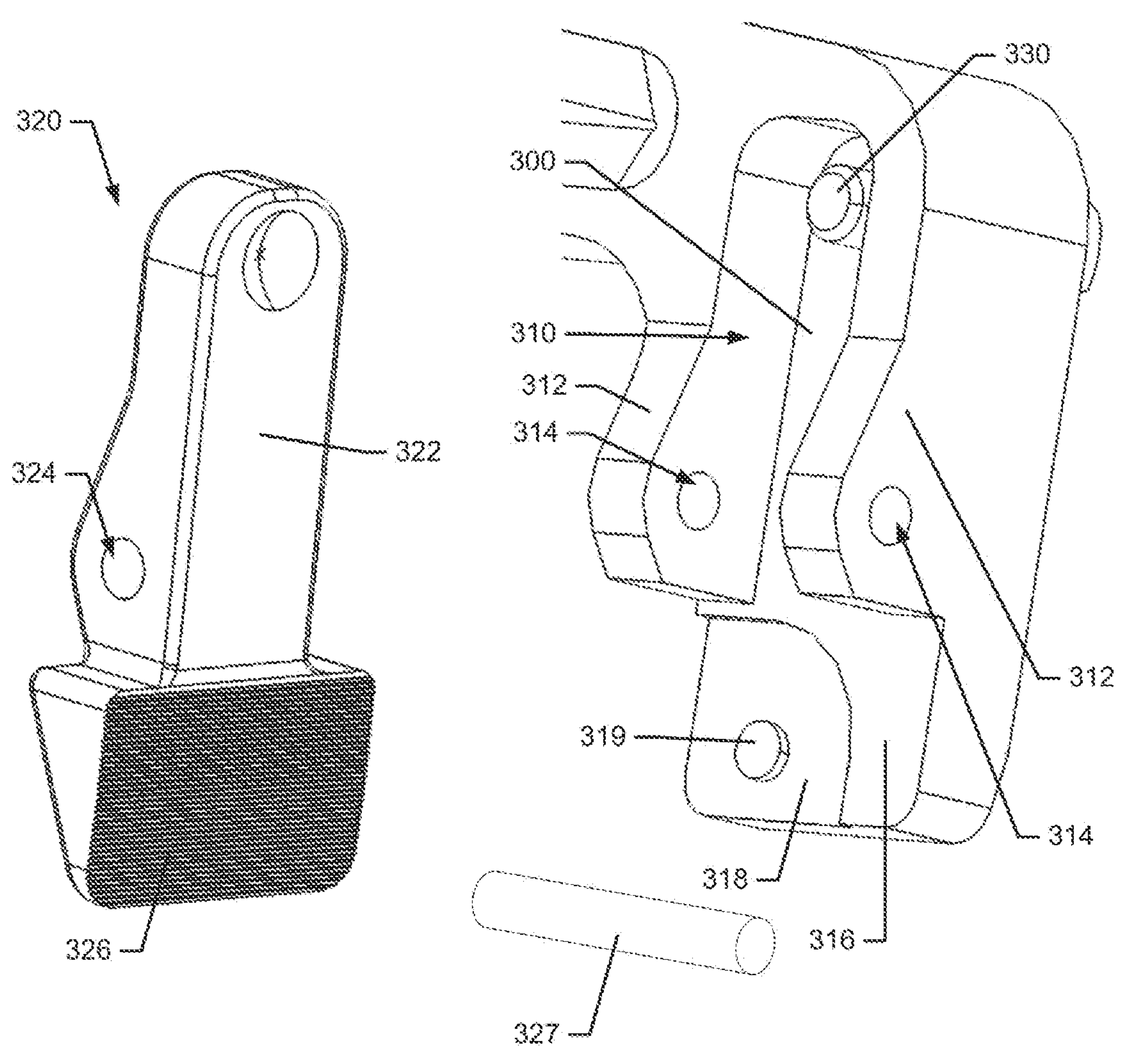
FIG. 6 is an exploded view of the multi-function blade engagement assembly of FIG. 5 in accordance with another example embodiment.

Components forming an example of the multi-function fixed blade engagement assembly 130 of FIG. 1 may be disposed at the engaging arm 236, and are shown in greater detail in FIGS. 4-6. Components forming an example of the movable blade engagement assembly 140 of FIG. 1 may be operably coupled to the handle portion 220 and the insertion portion 232, and are shown in greater detail in FIGS. 4, 7 and 8.

Referring first to components forming the multi-function fixed blade engagement assembly 130, the engaging arm 236 may include a body portion 300 that extends substantially perpendicularly away from the distal end of the extension portion 234. The body portion 300 may be substantially flat and continuous on a first lateral side thereof, except that a through hole 302 may be formed therein extending through the body portion 300 in a direction substantially perpendicular to a direction of extension of the extension portion 234 and a direction of extension of the engaging arm 236. The body portion 300 may have a clamping member channel 310 formed at a second lateral side thereof (opposite the first lateral side).

The clamping member channel 310 may have opposing shoulder members 312 on opposite sides thereof. The shoulder members 312 may each include a pin receiver 314 formed at distal ends thereof. The shoulder members 312 may extend only partially along the length of the engaging arm 236 on the second lateral side and the top edge 217 of the blade 210 may sit adjacent to or abut against one or both of the distal ends of the shoulder members 312, when the blade 210 is installed in the hacksaw 200.

A clamping surface 316 may be disposed proximate to one or both of the distal ends of the shoulder members 312. The clamping surface 316 may extend parallel to, and potentially engage, one of the side faces of the blade 210 when the blade 210 is installed for a situation in which the blade 210 extends beyond the engaging arm 236 when attached. However, if the blade 210 is shorter, and actually terminates at the engaging arm 236 when attached, the blade 210 may fit into a blade engagement groove 318, which may be formed in the clamping surface 316. The blade engagement groove 318 may be recessed from the clamping surface 316 and may be shaped to receive the first end 213 of the blade 210 and the first mounting hole 215 (i.e., for the blade 210 with the shorter length). As such, the blade engagement groove 318 may have a depth relative to the clamping surface 316 that is about equal to the thickness of the blade 210 (e.g., about 0.6 mm). A first engagement pin 319 may be disposed at the blade engagement groove 318 to extend about equal in length to the depth of the blade engagement groove 318 (e.g., about 0.6 mm).

A clamping member 320 may be shaped to fit at least partially inside the clamping member channel 310. In this regard, a lever arm 322 of the clamping member 320 may fit within the clamping member channel 310, and may have a pivot pin channel 324 formed therein. A clamping head 326 may be disposed at an end of the lever arm 322 proximate to the pivot pin channel 324. A pivot pin 327 may extend through the pin receivers 314 of the shoulder members 312 and through the pivot pin channel 324. Meanwhile, an adjusting screw 330 may pass through (and be in threaded engagement with) the through hole 302. By rotating the adjusting screw 330 in a first direction, the adjusting screw 330 may move through the through hole 302 to push a proximal end of the lever arm 322 away from the engaging arm 236 (i.e., in a direction tending out of the clamping member channel 310).

Accordingly, the distal end of the lever arm 322 and the clamping member 320 will be forced, by pivoting about the pivot pin 327, toward the engaging arm 236, and more specifically toward the clamping surface 316. As shown in FIG. 5, when the adjusting 330 is rotated in the first direction shown by arrow 380, the adjusting screw 330 exerts a force on the lever arm 322 indicated by arrow 382. This force causes the clamping member 320 to pivot about the pivot pin 327 as shown by arrow 384, which in turn exerts a force from the clamping head 326 onto the clamping surface 316 as shown by arrow 386. If the blade 210 extends along the clamping surface 316 (e.g., due to a long blade being in use) then the rotating of the adjusting screw 330 may cause the clamping member 320 to be tightened onto the blade 210. In this regard, one side face of the blade 210 may be engaged by the clamping member 320 and the other side face of the blade 210 may be adjacent the clamping surface 316 (and distal end of the first engagement pin 319). The adjusting screw 330 therefore is adjusted to increase the pinching force exerted on opposing side faces of the blade 210. Dotted lines 333 in FIG. 2 show a contact patch of an approximate location where the clamping member 320 and the clamping surface 316 pinch or engage with the blade 210.

If instead the blade 210 is shorter and terminates at the engaging arm 236, then the first mounting hole 215 may receive the first engagement pin 319 as the first end 213 of the blade 210 rests in the blade engagement groove 318. The clamping member 320 may still be tightened as noted above. However, pinching forces are not the primary means by which the blade 210 is retained in such an example. Instead, the first engagement pin 319 may retain the first end 213 of the blade 213.

As may be appreciated from the descriptions above, the multiple functions of the multi-function fixed blade engagement assembly 130 may include gripping, retaining, or holding either an end of the blade 210, or some portion of the blade 210 that is spaced apart from the end. These are two different functions, and require two different strategies and structures for engagement due to the different features of the blade 210 at these locations. The first clamping structure for doing one such function may therefore be configured to interface with a mounting hole, and the second clamping structure may instead be configured to pinch the blade 210 since no mounting hole is present spaced apart from the end of the blade 210. In each case, the clamping member 320 may form a part of the corresponding clamping structure, but a different surface (i.e., the clamping surface 316 or the blade engagement groove 318) is associated with each. Also, only one surface (i.e., the blade engagement groove 318) actively employs or requires the first engagement pin 319 to be a part of the clamping structure.

Figure 7:
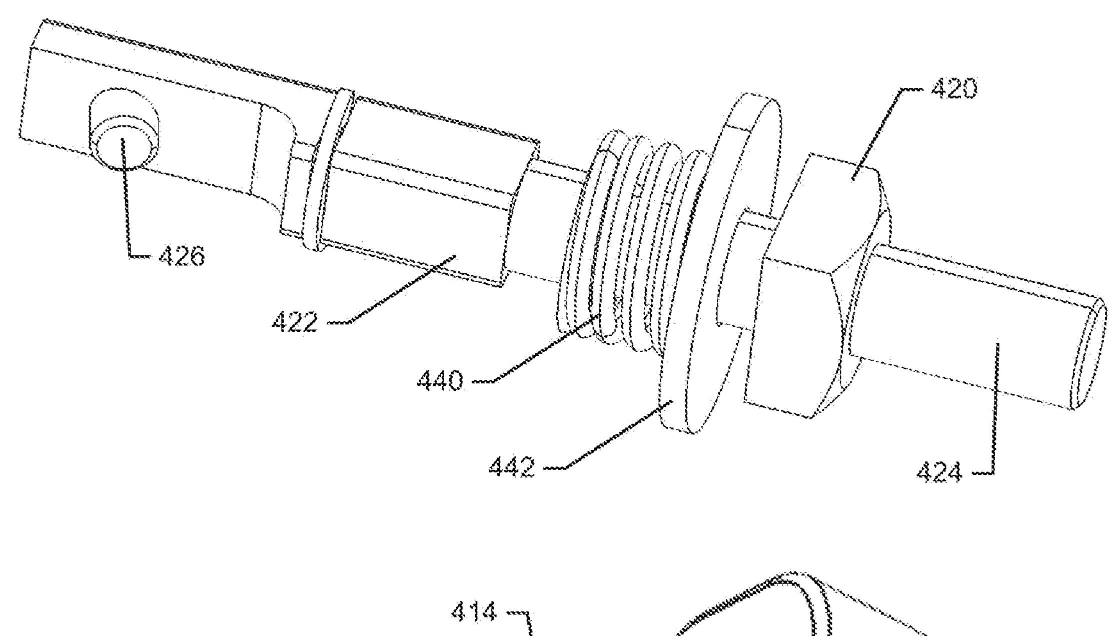
FIG. 7 is an isolated view of components of a movable blade engagement assembly in accordance with yet another example embodiment.
Figure 7:
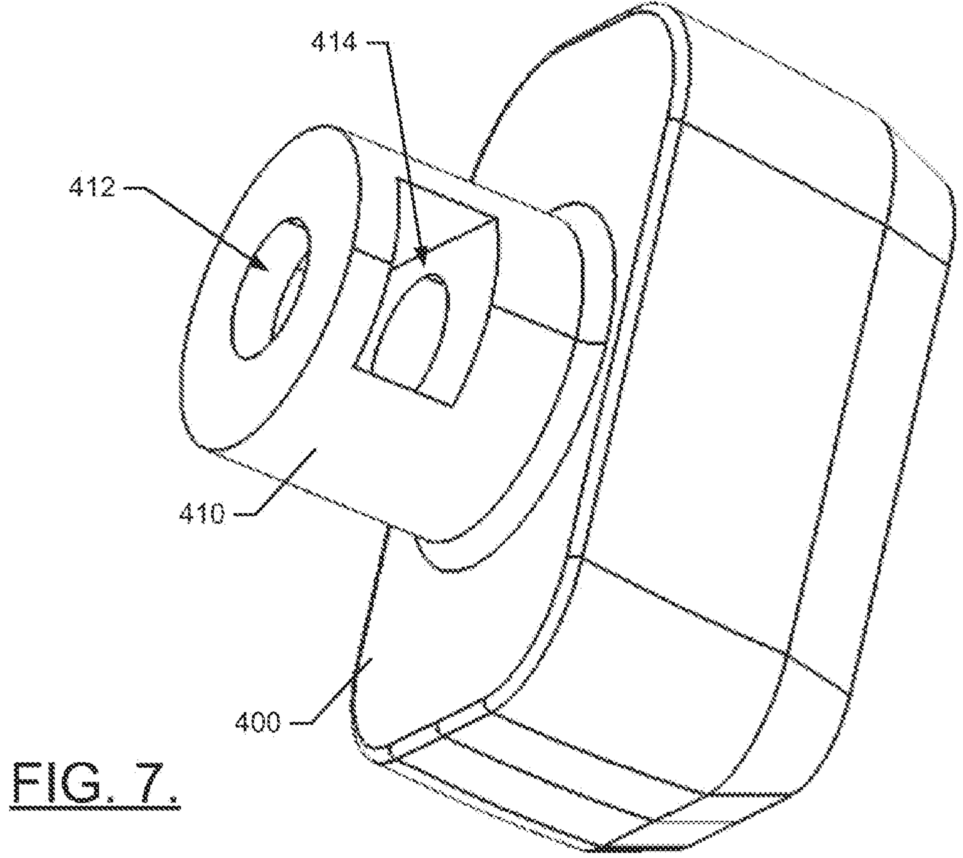
Figure 8:
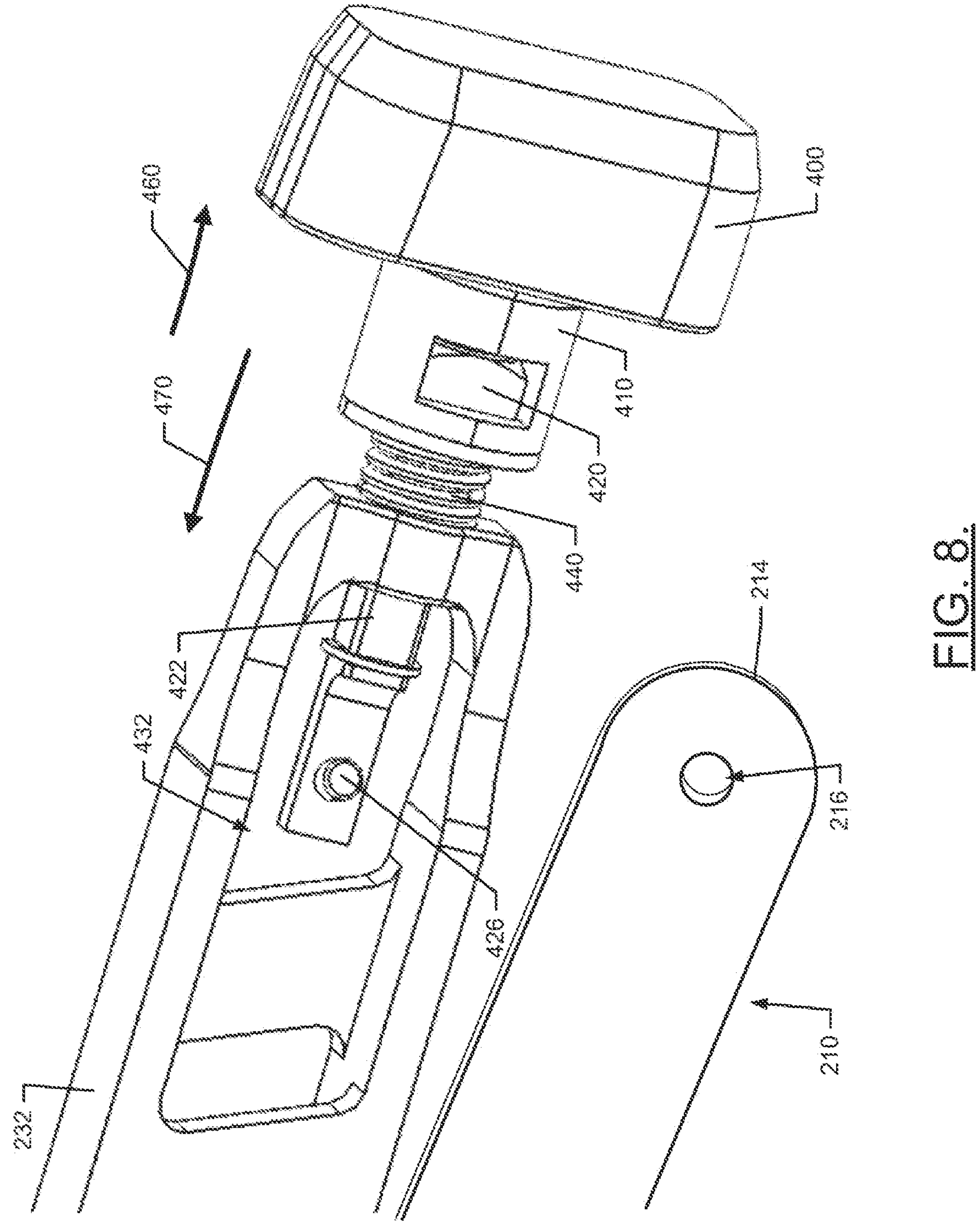
FIG. 8 is aa perspective and partially isolated view of the movable blade engagement assembly in accordance with an example embodiment.

Turning now to components of the movable blade engagement assembly 140 of FIG. 1, it can be seen in FIGS. 4, 7 and 8 that a rotatable member 400 may be provided to interface with the second end 224 of the handle portion 220. The rotatable member 400 may include a projection 410 that extends into the cavity 226 of the handle portion 220. The projection 410 may include an axial channel 412, and the axial channel 412 terminate at a nut retaining chamber 414. The nut retaining chamber 414 may have a side entrance cavity that enables an adjuster nut 420 to be slid into the nut retaining chamber 414 prior to being engaged on tensioning rod 422. In this regard, the tensioning rod 422 may have a threaded portion 424 at one end thereof. The adjuster nut 420 may be captured (and not rotatable relative to the rotatable member 400) when inside the nut retaining chamber 414. A second engagement pin 426 may be located at the opposite end of the tensioning rod 422 relative to the threaded portion 424. The second engagement pin 426 may extend at an angle (not necessarily, although possibly perpendicular) with respect to the longitudinal axis of the second engagement pin 426.

As shown in FIG. 4, the insertion portion 232 may include, at a proximal end thereof opposite the engaging arm 236, a rod channel 430. The rod channel 430 may be large enough to receive the tensioning rod 422. The insertion portion 232 may also include an engagement chamber 432 into which the rod channel 430 extends from the proximal end of the insertion portion 232. The engagement chamber 432 may align with the viewing windows 228 of the handle portion 220 when the insertion portion 232 is inserted into the cavity 226 of the handle portion 220. The second engagement pin 426 may generally remain visible in the engagement chamber 432 through the viewing window 228 to enable the second engagement pin 426 to be aligned with the first mounting hole 215 and inserted therein.

Although not required, in some embodiments, a coil spring 440 may be disposed on the tensioning rod 422 proximate to a washer 442 that rides against a distal end of the projection 410. The coil spring 440 may be compressed between the washer 442 or the distal end of the projection 410 and the insertion portion 232 proximate to the rod channel 430 when tension is reduced on the blade 210. Meanwhile, the coil spring 440 may release, and thereby facilitate increasing tension, when tension is increased on the blade 210.

In a typical situation, the second end 214 of the blade 210 may be inserted into a blade channel 450 in the insertion portion 232. The second engagement pin 426 may be aligned with, and inserted into, the first mounting hole 215 of the blade 210. The contact patch may then be pinched by the clamping member 320 between the clamping head 326 and the clamping surface 316 by rotating the adjusting screw 330 as described above. Alternatively, if the blade 210 is shorter, the first engagement pin 319 may be inserted into the first mounting hole 215 to retain the first end 213 of the blade 210.

Thereafter, tension may be applied (for increasing or decreasing blade tension) by rotating the rotatable member 400. In this regard, rotation of the rotatable member 400 will carry the adjuster nut 420 since the adjuster nut 420 is captured inside the nut retaining chamber 414. As the adjuster nut 420 rotates with the rotatable member 400, the threaded portion 424 of the tensioning rod 422 is drawn through the adjuster nut 420 either pulling the second engagement pin 426 rearward in the direction of arrow 460 to increase tension, or pushing the second engagement pin 426 forward in the direction of arrow 470 to decrease tension (dependent on the direction of rotation). Thus, rotational movement of the rotatable member 400 about an axis (e.g., a longitudinal axis of the blade 210 and the handle portion 220) is translated into linear movement of the tensioning rod 422.

In an example embodiment, a hacksaw may be provided. The hacksaw may include a blade support frame, a handle operably coupled to the blade support frame at a first end of the blade support frame, a movable blade engagement assembly and a multi-function fixed blade engagement assembly. The multi-function fixed blade engagement assembly may be disposed at a second end of the blade support frame. The multi-function fixed blade engagement assembly may include a first clamping structure to affix a first end of a blade to the hacksaw via an engagement pin and a second clamping structure to affix a portion of the blade spaced apart from the first end to the hacksaw via a clamping or pinching force exerted on the portion of the blade. The movable blade engagement assembly may be operably coupled to the handle and to a second end of the blade. Tension on the blade may be adjustable by adjustment of the movable blade engagement assembly.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the blade support frame may include an insertion portion that is inserted into the handle, an extension portion that extends from the insertion portion away from the handle, and an engaging arm at which the multi-function fixed blade engagement assembly may be disposed. In an example embodiment, the second clamping structure may include a clamping surface disposed at the engaging arm. The multi-function fixed blade engagement assembly may include a clamping member including a lever arm, and a clamping head. An adjusting screw may be operably coupled to the lever arm to pivot the clamping member such that displacement of the lever arm away from the engaging arm forces the clamping head toward the clamping surface. In some cases, a pivot pin may be provided to pass through a portion of the lever arm and shoulder members disposed on opposing sides of a clamping member channel formed at the engaging arm. The pivot pin may define a pivot axis about which the clamping member pivots responsive to operation of the adjusting screw. In an example embodiment, the first clamping structure may include a blade engagement groove formed at a portion of the clamping surface. The blade engagement groove may include the engagement pin (i.e., the engagement pin may extend away from a surface of the blade engagement groove). The blade engagement groove may be a recessed portion of the clamping surface having a depth about equal to a width of the blade. In some cases, the multi-function fixed blade engagement assembly may be configured to retain a first blade having a first length extending from the multi-function fixed blade engagement assembly to a point inside the handle via the first clamping structure, and to retain a second blade having a second length extending from the point inside the handle along the blade support frame and beyond the multi-function fixed blade engagement assembly via the second clamping structure. In an example embodiment, the movable blade engagement assembly may include a rotatable member operably coupled to a tensioning rod. The rotatable member may be disposed at distal end of the handle and may extend into a cavity formed in the handle to interface with the tensioning rod to change tension applied to the blade via rotation of the rotatable member. In some cases, the tensioning rod may have a threaded portion at a first end thereof and a second engagement pin disposed proximate a second end thereof. The rotatable member may capture a threaded nut operably coupled to the threaded portion. Rotation of the rotatable member in a first direction may rotate the threaded nut to carry the tensioning rod linearly away from the blade support frame and rotation of the rotatable member in a second direction may rotate the threaded nut to carry the tensioning rod linearly toward the blade support frame. In an example embodiment, a coil spring may be disposed about the tensioning rod and may be biased to assist increasing tension in the blade when the rotatable member is rotated in the second direction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hacksaw comprising:

a blade support frame;

a handle operably coupled to the blade support frame at a first end of the blade support frame;

a multi-function fixed blade engagement assembly disposed at a second end of the blade support frame, the multi-function fixed blade engagement assembly including a first clamping structure to affix a first end of a blade to the hacksaw via an engagement pin and a second clamping structure to affix a portion of the blade spaced apart from the first end to the hacksaw via a clamping or pinching force exerted on the portion of the blade; and a movable blade engagement assembly operably coupled to the handle and to a second end of the blade, wherein tension on the blade is adjustable by adjustment of the movable blade engagement assembly.

2. The hacksaw of claim 1, wherein the blade support frame comprises an insertion portion that is inserted into the handle, an extension portion that extends from the insertion portion away from the handle, and an engaging arm, and wherein the multi-function fixed blade engagement assembly is disposed at the engaging arm.

3. The hacksaw of claim 2, wherein the second clamping structure comprises a clamping surface disposed at the engaging arm, wherein the multi-function fixed blade engagement assembly comprises a clamping member including a lever arm, and a clamping head, and wherein an adjusting screw is operably coupled to the lever arm to pivot the clamping member such that displacement of the lever arm away from the engaging arm forces the clamping head toward the clamping surface.

4. The hacksaw of claim 3, wherein a pivot pin passes through a portion of the lever arm and shoulder members disposed on opposing sides of a clamping member channel formed at the engaging arm, the pivot pin defining a pivot axis about which the clamping member pivots responsive to operation of the adjusting screw.

5. The hacksaw of claim 3, wherein the first clamping structure comprises a blade engagement groove formed at a portion of the clamping surface, the blade engagement groove including the engagement pin, and wherein the blade engagement groove is a recessed portion of the clamping surface having a depth about equal to a width of the blade.

6. The hacksaw of claim 1, wherein the multi-function fixed blade engagement assembly is configured to retain a first blade having a first length extending from the multi-function fixed blade engagement assembly to a point inside the handle via the first clamping structure, and to retain a second blade having a second length extending from the point inside the handle along the blade support frame and beyond the multi-function fixed blade engagement assembly via the second clamping structure.

7. The hacksaw of claim 1, wherein the movable blade engagement assembly comprises a rotatable member operably coupled to a tensioning rod, wherein the rotatable member is disposed at distal end of the handle and extends into a cavity formed in the handle to interface with the tensioning rod to change tension applied to the blade via rotation of the rotatable member.

8. The hacksaw of claim 7, wherein the tensioning rod has a threaded portion at a first end thereof and a second engagement pin disposed proximate a second end thereof, wherein the rotatable member captures a threaded nut operably coupled to the threaded portion, and wherein rotation of the rotatable member in a first direction rotates the threaded nut to carry the tensioning rod linearly away from the blade support frame and rotation of the rotatable member in a second direction rotates the threaded nut to carry the tensioning rod linearly toward the blade support frame.

9. The hacksaw of claim 8, wherein a coil spring is disposed about the tensioning rod and is biased to assist increasing tension in the blade when the rotatable member is rotated in the second direction.

10. A hacksaw comprising:

a blade support frame;

a handle operably coupled to the blade support frame at a first end of the blade support frame;

a multi-function fixed blade engagement assembly disposed at a second end of the blade support frame, the multi-function fixed blade engagement assembly including a first clamping structure to affix a first end of a blade to the hacksaw via an engagement pin and a second clamping structure to affix a portion of the blade spaced apart from the first end to the hacksaw via a clamping or pinching force exerted on the portion of the blade; and a second blade engagement assembly operably coupled to the handle and to a second end of the blade.

11. The hacksaw of claim 10, wherein the blade support frame comprises an insertion portion that is inserted into the handle, an extension portion that extends from the insertion portion away from the handle, and an engaging arm, and wherein the multi-function fixed blade engagement assembly is disposed at the engaging arm.

12. The hacksaw of claim 11, wherein the second clamping structure comprises a clamping surface disposed at the engaging arm, wherein the multi-function fixed blade engagement assembly comprises a clamping member including a lever arm, and a clamping head, and wherein an adjusting screw is operably coupled to the lever arm to pivot the clamping member such that displacement of the lever arm away from the engaging arm forces the clamping head toward the clamping surface.

13. The hacksaw of claim 12, wherein a pivot pin passes through a portion of the lever arm and shoulder members disposed on opposing sides of a clamping member channel formed at the engaging arm, the pivot pin defining a pivot axis about which the clamping member pivots responsive to operation of the adjusting screw.

14. The hacksaw of claim 12, wherein the first clamping structure comprises a blade engagement groove formed at a portion of the clamping surface, the blade engagement groove including the engagement pin, and wherein the blade engagement groove is a recessed portion of the clamping surface having a depth about equal to a width of the blade.

15. The hacksaw of claim 10, wherein the multi-function fixed blade engagement assembly is configured to retain a first blade having a first length extending from the multi-function fixed blade engagement assembly to a point inside the handle via the first clamping structure, and to retain a second blade having a second length extending from the point inside the handle along the blade support frame and beyond the multi-function fixed blade engagement assembly via the second clamping structure.

16. A hacksaw comprising:

a blade support frame;

a handle operably coupled to the blade support frame at a first end of the blade support frame;

a fixed blade engagement assembly disposed at a second end of the blade support frame; and a movable blade engagement assembly operably coupled to the handle and to a second end of the blade, wherein tension on the blade is adjustable by adjustment at the movable blade engagement assembly and corresponding linear movement of the movable blade engagement assembly, wherein the movable blade engagement assembly comprises a rotatable member operably coupled to a tensioning rod, and wherein the rotatable member is disposed at a distal end of the handle and is disposed in a cavity formed in the handle and is surrounded on at least four sides by a portion of the handle to interface with the tensioning rod to change tension applied to the blade via rotation of the rotatable member.

17. The hacksaw of claim 16, wherein the tensioning rod has a threaded portion at a first end thereof and an engagement pin disposed proximate a second end thereof, wherein the rotatable member captures a threaded nut operably coupled to the threaded portion, and wherein rotation of the rotatable member in a first direction rotates the threaded nut to carry the tensioning rod linearly away from the blade support frame and rotation of the rotatable member in a second direction rotates the threaded nut to carry the tensioning rod linearly toward the blade support frame.

18. The hacksaw of claim 17, wherein a coil spring is disposed about the tensioning rod and is biased to assist increasing tension in the blade when the rotatable member is rotated in the second direction.

19. The hacksaw of claim 16, wherein the corresponding linear movement of the movable blade engagement assembly is in line with a longitudinal centerline of the blade and the handle.

* * * * *